(12) United States Patent
Berman et al.

(10) Patent No.: US 7,994,735 B1
(45) Date of Patent: Aug. 9, 2011

(54) SOLAR-CONTROLLED LIGHT DEVICE

(76) Inventors: Amy S. Berman, San Diego, CA (US);
Michael Feder, San Diego, CA (US);
Eric D. Smith, San Diego, CA (US)

( * ) Notice: Subject to any disclaimer, the term of this patent is extended or adjusted under 35 U.S.C. 154(b) by 204 days.

(21) Appl. No.: 12/507,240

(22) Filed: Jul. 22, 2009

(51) Int. Cl.
*H05B 37/02* (2006.01)

(52) U.S. Cl. ........................................ 315/297; 315/355

(58) Field of Classification Search .................. 315/160, 315/291, 297, 349, 354
See application file for complete search history.

(56) References Cited

U.S. PATENT DOCUMENTS

| | | | |
|---|---|---|---|
| 5,101,329 A | 3/1992 | Doyle | |
| 5,735,492 A | 4/1998 | Pace | |
| 5,782,552 A | 7/1998 | Green | |
| 5,819,455 A * | 10/1998 | Tsuda | 40/580 |
| 6,004,002 A | 12/1999 | Giannone | |
| 6,031,468 A | 2/2000 | Tsao et al. | |
| 6,092,318 A | 7/2000 | Arie et al. | |
| 7,044,616 B2 | 5/2006 | Shih | |
| 7,357,527 B2 | 4/2008 | Meyers et al. | |
| 7,387,400 B2 | 6/2008 | Nakata et al. | |
| 2003/0103345 A1 | 6/2003 | Nolan | |
| 2005/0046595 A1 | 3/2005 | Blyth | |
| 2005/0076551 A1 | 4/2005 | Silverstone et al. | |
| 2007/0236924 A1 | 10/2007 | Personius | |
| 2008/0258675 A1* | 10/2008 | Caldwell et al. | 320/101 |
| 2010/0327766 A1* | 12/2010 | Recker et al. | 315/291 |

* cited by examiner

*Primary Examiner* — Don P Le
(74) *Attorney, Agent, or Firm* — Frank G. Morkunas; Steve Webb

(57) ABSTRACT

A solar-controlled light device with a circuit-control having a phototransistor, a first resistor, and a first transistor connected to a storage unit, to a solar cell, and to a current-control. The current-control has a transformer, a second resistor, and a second transistor, connected at one end of the current-control to a light and at another end connected to the circuit-control, wherein the current-control senses the amount of power and boost the power as needed to a sufficient level to power the lights.

6 Claims, 2 Drawing Sheets

SOLAR-CONTROLLED LIGHT DEVICE

CROSS REFERENCES TO RELATED APPLICATIONS

None.

STATEMENT REGARDING FEDERALLY-SPONSORED RESEARCH OR DEVELOPMENT

Not applicable.

BACKGROUND

This device of the present disclosure relates to an improvement in lighting device, and more particularly to self-sustaining lighting devices utilizing solar power to power various lighting devices at night.

There are numerous lighting devices, many of which utilize solar power, but these devices lack the simplicity of the present device, lack the ability to properly detect the amount of current flowing and boost that flow when and as necessary, and lack the unique double-coiled transformer as configured in accordance with the detailed description set forth herein to thereby function in the capacity of a sensor component and booster component in conjunction with its configuration with it complimentary components.

As a result, this unique lighting device is easy and inexpensive to manufacture, easy and inexpensive to operate, and more importantly, easy and inexpensive to maintain.

The foregoing has outlined some of the more pertinent objects of the lighting device. These objects should be construed to be merely illustrative of some of the more prominent features and applications of the lighting device. Many other beneficial results can be attained by applying the disclosed lighting device in a different manner or by modifying the lighting device within the scope of the disclosure. Accordingly, other objects and a fuller understanding of the lighting device may be had by referring to the summary of the lighting device and the detailed description of the preferred embodiment in addition to the scope of the lighting device defined by the claims taken in conjunction with the accompanying drawings.

SUMMARY

The above-noted problems, among others, are overcome by the lighting device. Briefly stated, the lighting device contemplates a solar-controlled light device having a solar cell, a power storage means, a circuit-control means for placing the device into an open mode by opening the flow of energy, a current-control means for sensing and controlling the flow of energy, and a light to be powered on [open mode] at darkness and to be powered off [closed mode] at daylight. The circuit-control means has a phototransistor, a first resistor, and a first transistor connected to the power storage unit, to the solar cell, and to the current-control means.

The current-control has a transformer, a second resistor, and a second transistor, wherein the current-control means is connected at one end to the light and the other end of the current-control means is connected to the circuit-control. The current-control is adapted to sense the amount of electrical power flowing in the open mode and to boost the electrical power as needed to a sufficient level to power the lights.

The foregoing has outlined the more pertinent and important features of the lighting device in order that the detailed description that follows may be better understood so the present contributions to the art may be more fully appreciated. Additional features of the lighting device will be described hereinafter which form the subject of the claims. It should be appreciated by those skilled in the art that the conception and the disclosed specific embodiment may be readily utilized as a basis for modifying or designing other structures and methods for carrying out the same purposes of the lighting device. It also should be realized by those skilled in the art that such equivalent constructions and methods do not depart from the spirit and scope of the lighting device as set forth in the appended claims.

BRIEF DESCRIPTION OF THE DRAWINGS

For a fuller understanding of the nature and objects of the lighting device, reference should be had to the following detailed description taken in conjunction with the accompanying drawings in which.

DETAILED DESCRIPTION

Figure 1:
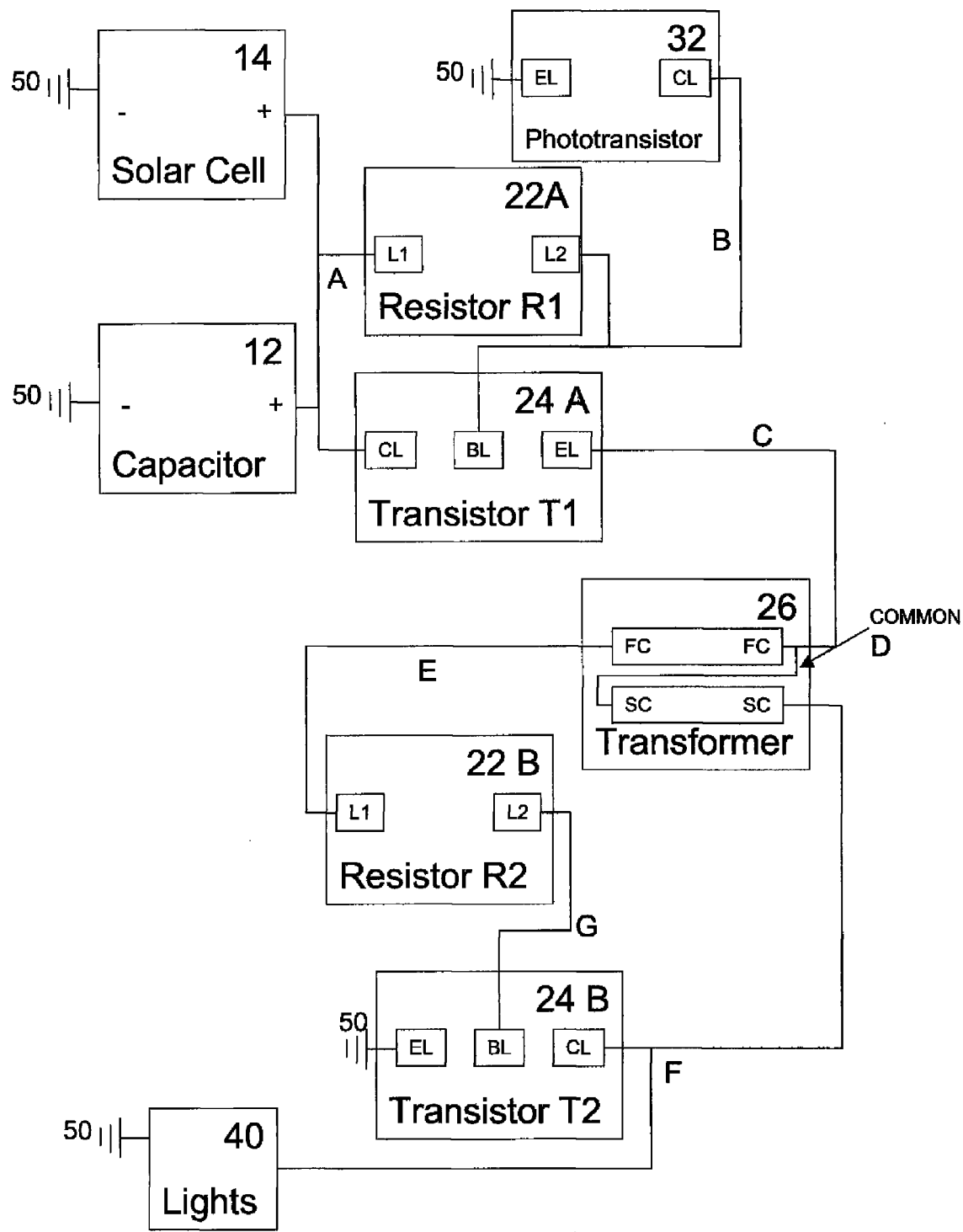
FIG. 1 is block diagram illustrating the components and their configuration in the preferred embodiment.

The lighting system and unique device of this disclosure basically comprises one or more of the following conventionally availably components: a solar cell, a capacitor, a resistor, a transistor, a transformer, a phototransistor, and a lighting component [typically LED lights]. Typical components, or their equivalent, for this system and specific lighting device and their specifications, could include:

1. Though any capacitor having equivalent specifications will suffice, the capacitor used in the described embodiment was a NessCap Brand capacitor, Model PSHLR-0050C0-002R3, of about 2.3V and storage potential of about 50 Farad. The capacitor used should have a high Farad rating at a low voltage.

2. Any generic solar cell of approximately 2.2 v and 112 mA. The solar cell should have a voltage rating approximately equivalent to that of the capacitor.

3. Any generic resistor, of about 10 kilo ohm at ⅛ Watt with a tolerance of about 5%, or equivalent;

4. Any generic NPN-type switching transistor having a power dissipation of about 350 mW and I(C) Max. of 200 mA as the maximum current for this lighting device.

5. A Siemens, infrared NPN phototransistor, Model BPX81.

6. A Steward, transformer with a ferrite core, Model 35T0231-00P, of about 5.84 mm O.D.×3.05 mm I.D.×1.52 mm L. It is best if the transformer have 30 gauge wire with a turn ratio for the winding of each of two coils [a first coil and a second coil] at 1:1 with about 20 turns per wire resulting in an inductance of about 300 UH per coil. This is important as the transformer serves to as the current-control mechanism by sensing the voltage and regulating it and boosting it as necessary to power the lights.

7. Lite-on brand white super-bright LED lights, Model LAW-420D7, of about 3.3V with current of about 30 mA, and power dissipation of about 120 mW.

As configured in this disclosure and in operation, the lighting device becomes a self-contained self-generating lighting device which captures solar energy during the daylight, converts the solar energy to electricity, and stores the electricity for use during the evening when ambient daylight is no longer detected. A simple solar cell is used to capture the solar energy and convert it into electricity.

A super-capacitor is charged by the converted electricity and stores such for later use. When daylight is no longer detected by the phototransistor, the solar cell will cease its operation and a first switching transistor causes a circuit to open from the capacitor to power the lights associated with the lighting device. Internal circuitry regulates the voltage and current streaming from the capacitor to provide a consistent and long-lasting light from the lighting device with minimal, if any, variations in luminescence as the capacitor discharges.

This continues until the phototransistor detects light. When such occurs the phototransistor shuts down the first switching transistor which then closes the circuit and thereby allows the capacitor to re-charge. This also provides a means to "dump" a small portion of the electricity from the solar cell to prevent the capacitor from prematurely discharging yet allows it to fully discharge in the dark. A second switching transistor oscillates with the current in the transformer, boosting and smoothing the power from the capacitor to provide an even flow of current to power the lights.

A first resistor operates in conjunction with the first switching transistor and permits only a minute portion of the electricity passing from the solar cell to flow to the phototransistor. This allows the capacitor to charge. During non-daylight hours, the first resistor as wired shorts the collector lead and base lead of the first transistor thereby minimizing loss of electricity and current.

The second resistor operates in tandem with the second transistor and the transformer to allow for a controlled oscillation and smooth flow of current to the lights. The concept and components for this lighting device are simple, efficient, effective, and inexpensive.

Reference is now made to FIG. 1 to fully describe a preferred embodiment of the configuration of the components and their connections, which are critical for the operation of the circuit and its control, the current and its control, and the voltage necessary to maintain this lighting system and device as operational.

The positive leads of the capacitor 12 and the solar cell 14 are connected to one another and to a first lead [L1] of a first resistor [R1] 22A and to the collector lead [CL] of a first transistor [T1] 24A. By way of Line-B, the collector lead [CL] of the phototransistor 32 is connected to the second lead [L2] of the first resistor [R1] 22A and to the base lead [BL] of the first transistor [T1] 24. The negative output of the capacitor 12, solar cell 14, and the emitter lead [EL] of the phototransistor 32 are connected to a common ground 50.

Line-C connects the emitter lead [EL] of the first transistor [T1] 24A to a common lead [Line-D] and to one end of the first coil [FC]. This configuration forces the capacitor 12 to store electrical power generated by the solar cell 14 and, in conjunction with the phototransistor 32 and the first resistor 22A, enables the first transistor [T1] 24A to control whether and when power will flow from the capacitor 12 to the transformer 26.

This type of configuration also pulls the current flowing to the base lead [BL] of the first transistor [T1] 24A to positive and functions as the control to thereby activate the circuit and, if ambient light is detected, also pulls the current flowing to the base lead [BL] of the first transistor 24A to negative and deactivates that circuit. If, however, no ambient light is detected by, or exists, the phototransistor 32 will not activate.

Typically, during daylight hours, the phototransistor 32 will be active and prevent the first transistor [T1] 24A from activating by drawing current away from the base lead [BL] of the first transistor [T1] 24A, preventing the solar cell 14 and the capacitor 12 from powering the rest of the circuit. When this occurs, the solar cell 14 recharges the capacitor 12 via the connection depicted by Line-A. During non-daylight hours, the phototransistor 32 deactivates, allowing the first transistor [T1] 24A to activate, completing the circuit and providing power from the capacitor 12 to the rest of the circuit thereby allowing the rest of the circuit to activate.

The common lead of the transformer 26 [Line-D] also connects one lead of the transformer's coil [first coil (FC)] to the opposing lead of the transformer's second coil [SC]. This connection ensures that if current is flowing through the second coil [SC] of the transformer 26 it will create a magnetic field that will cancel out current flowing through the first coil [FC] of the transformer 26.

In this embodiment, the remaining lead of the first coil [FC] of the transformer 26 connects to a first lead [L1] of the second resistor [R2] 22B through Line-E and the second lead [L2] of the second resistor [R2] 22B connects to the base lead [BL] of the second transistor [T2] 24B through Line-G. As so configured, the first coil [FC] of the transformer 26, combined with the second resistor [R2] 22B and the second transistor [T2] 24B, act as a sensor to detect whether or not a sufficient amount of current is flowing through the second coil [SC] of the transformer 26 and if not, to "boost" the flow thereby increasing the voltage to an amount sufficient to power the lights 40.

The emitter lead [EL] of the second transistor [R2] 24B is connected to the common ground 50 and the remaining lead of the second coil [SC] of the transformer 26 is connected to the collector lead [CL] of the second transistor [T2] 24B and to the lighting array 40 through Line-F.

The lighting array 40 is also connected to the common ground 50. The second transistor [T2] 24B initiates the lighting operation by allowing current to flow freely through the second coil [SC] and to the ground 50; however, if sufficient current flows through the second coil [SC] of the transformer 26, the second transistor [T2] 24B deactivates and forces current to flow through the lighting array 40. In doing so, the second coil [SC] of the transformer 26 acts like a temporary battery in series with the capacitor 12 and thereby generates sufficient voltage to power the lights of the light array 40. If, however, the current flowing through the second coil [SC] cannot sustain this output, the current will drop triggering current to flow through the first coil [FC] of the transformer 26 which thereby causes the second transistor [T2] 24B to reactivate and start the cycle over again.

The second resistor [T2] 22B limits the amount of current flowing into the base lead [BL] of the second transistor [T2] 24B, therefore preventing the second transistor [T2] 24B from suffering damage as a result of current flowing from the first coil [FC] of the transformer 26.

Figure 2:
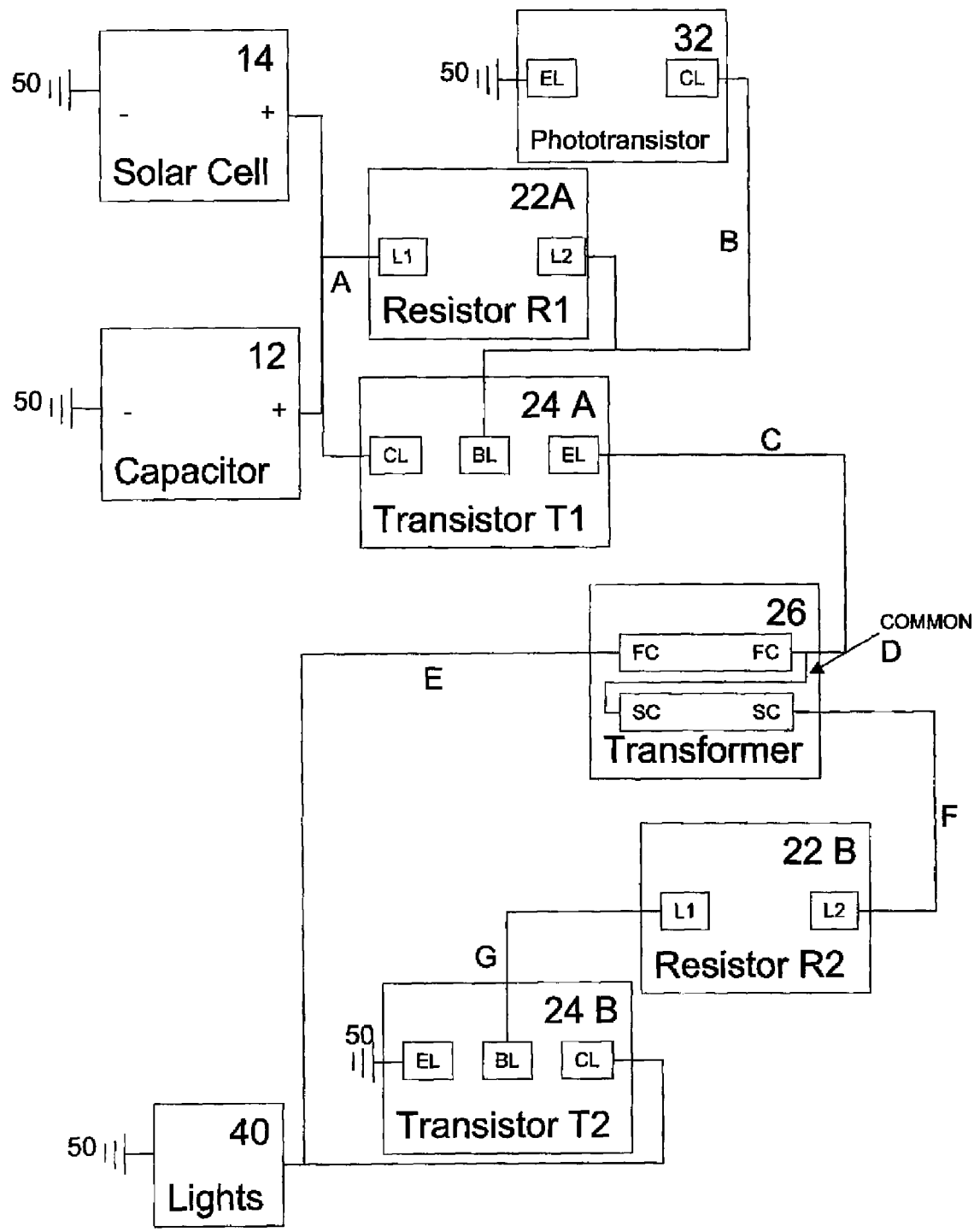
FIG. 2 is a second embodiment of a block diagram illustrating the components and their configuration.

FIG. 2 illustrates a second, but similar embodiment, wherein the remaining lead of the first coil [FC] of the transformer 26 connects to a collector lead [CL] of the second transistor [T2] 24B and to the lights 40 through Line-E. The remaining lead of the second coil [SC] connects to the second lead [L2] of the second resistor [R2] 22B through Line-F and the first lead [L1] of the second resistor [R2] connects to the base lead [BL] of the second transistor [T2] 24B through Line-G. The emitter lead [EL] of the second transistor [T2] 24B, as well as the ground of the lights 40, are connected to the common ground 50.

As so configured in this embodiment, and as described above, the first coil [FC] of the transformer 26, combined with the second resistor [R2] 22B and the second transistor [T2] 24B, also act as a sensor to detect whether or not a sufficient amount of current is flowing through the second coil [SC] of the transformer 26 and if not, to "boost" the flow thereby increasing the voltage to an amount sufficient to power the lights 40 and operates in the same manner as described above.

The present disclosure includes that contained in the present claims as well as that of the foregoing description. Although this lighting device has been described in its preferred form with a certain degree of particularity, it is understood that the present disclosure of the preferred form has been made only by way of example and numerous changes in the details of construction and combination and arrangement of parts and method steps may be resorted to without departing from the spirit and scope of the lighting device. Accordingly, the scope of the lighting device should be determined not by the embodiment[s] illustrated, but by the appended claims and their legal equivalents.

Applicant[s] have attempted to disclose all the embodiment[s] of the lighting device that could be reasonably foreseen. It must be understood, however, that there may be unforeseeable insubstantial modifications to lighting device that remain as equivalents and thereby falling within the scope of the lighting device.

What is claimed is:

1. A solar-controlled light device comprising:
   (a) a solar cell having a positive end and a negative end wherein said negative end is connected to a common ground;
   (b) power storage means for storing electrical energy received from said solar cell and for releasing said electrical energy, said power storage means having a positive end and a negative end wherein said positive end is connected to said positive end of said solar cell and said negative end is connected to said common ground;
   (c) light source for receiving said electrical energy, said light source having a positive end and a negative end wherein said negative end is connected to said common ground;
   (d) circuit-control means for controlling a circuit from said power storage means to said light source by selectively opening the circuit thereby placing the device into an open mode to power said light source and for closing said circuit and placing the device into a closed mode and terminating said circuit and power to said light source; and
   (e) current-control means for controlling rate of flow of said current when said circuit is in said open mode, sensing when said current is too low to power said light source, and boosting said circuit to a sufficient power level to power said light source when said power is too low.

2. The solar-controlled light device of claim 1 wherein said current-control means comprises:

a transformer having a first coil with a first end and a second end and a second coil having a first end and a second end wherein the first end of said first coil is connected the second end of said second coil by a common line;
   a resistor-R2 having a first lead and a second lead wherein said first lead is connected to said second end of said first coil; and
   a transistor-T2 having a collector lead, a base lead, and an emitter lead wherein said collector lead is connected to said first end of said second coil and to said positive end of said light source, said base lead is connected to said second lead of said resistor-R2, and said emitter lead is connected to said common ground.

3. The solar-controlled light device of claim 2 wherein said first coil and said second coil each have a wire of approximately similar gauge with approximately 20 turns therearound thereby bearing a winding turn-ratio of 1:1 and bearing an approximate inductance of about 300 UH per coil.

4. The solar-controlled light device of claim 2 wherein said circuit-control means comprises:

a phototransistor having a collector lead and an emitter lead wherein said emitter lead is connected to said common ground;
   a resistor-R1 having a first lead and a second lead wherein said first lead is connected to said solar cell and to said power storage means and said second lead is connected to said collector lead of said phototransistor;
   a transistor-T1 having a collector lead, a base lead, and an emitter lead wherein said collector lead is connected to said solar cell and to said power storage means, said base lead is connected to said second lead of said resistor-R1, and said emitter lead is connected to said common line.

5. The solar-controlled light device of claim 1 wherein said current-control means comprises:

a transformer having a first coil with a first end and a second end and a second coil having a first end and a second end wherein the first end of said first coil is connected the second end of said second coil by a common line;
   a resistor-R2 having a first lead and a second lead wherein said second lead is connected to said first end of said second coil; and
   a transistor-T2 having a collector lead, a base lead, and an emitter lead wherein said collector lead is connected to said second end of said first coil, said base lead is connected to said first lead of said resistor-R2, and said emitter lead is connected to said common ground.

6. The solar-controlled light device of claim 5 wherein said first coil and said second coil each have a wire of approximately similar gauge with approximately 20 turns therearound thereby bearing a winding turn-ratio of 1:1 and bearing an approximate inductance of about 300 UH per coil.

* * * * *